US011571651B2

(12) United States Patent
Rangnekar et al.

(10) Patent No.: US 11,571,651 B2
(45) Date of Patent: Feb. 7, 2023

(54) CORE-SHELL COMPOSITE ADSORBENT FOR USE IN HYDROGEN AND HELIUM PSA PROCESSES

(71) Applicants: Neel Rangnekar, Buffalo, NY (US); Yang Luo, Amherst, NY (US); Jennifer Bugayong Luna, Lancaster, NY (US)

(72) Inventors: Neel Rangnekar, Buffalo, NY (US); Yang Luo, Amherst, NY (US); Jennifer Bugayong Luna, Lancaster, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 85 days.

(21) Appl. No.: 16/382,335

(22) Filed: Apr. 12, 2019

(65) Prior Publication Data
US 2019/0232212 A1 Aug. 1, 2019

Related U.S. Application Data (63) Continuation-in-part of application No. 15/852,042, filed on Dec. 22, 2017, now Pat. No. 10,646,816.

(51) Int. Cl.
| B01D 53/04 | (2006.01) |
| B01J 20/20 | (2006.01) |
| B01D 53/047 | (2006.01) |
| B01J 20/12 | (2006.01) |
| B01J 20/16 | (2006.01) |
| B01J 20/28 | (2006.01) |
| B01D 53/02 | (2006.01) |
| B01J 20/32 | (2006.01) |

(52) U.S. Cl.
CPC ........... *B01D 53/047* (2013.01); *B01D 53/02* (2013.01); *B01J 20/12* (2013.01); *B01J 20/165* (2013.01); *B01J 20/20* (2013.01); *B01J 20/2803* (2013.01); *B01J 20/28054* (2013.01); *B01J 20/3293* (2013.01); *B01D 2253/102* (2013.01); *B01D 2253/108* (2013.01); *B01D 2253/1085* (2013.01); *B01D 2253/11* (2013.01); *B01D 2253/25* (2013.01); *B01D 2257/102* (2013.01); *B01D 2257/502* (2013.01); *B01D 2257/504* (2013.01); *B01D 2257/7025* (2013.01); *B01D 2259/4145* (2013.01)

(58) Field of Classification Search
CPC ...... B01D 53/02; B01D 53/04; B01D 53/047; B01D 2253/102; B01D 2253/108; B01D 2253/1085; B01D 2253/11; B01D 2253/25; B01D 2253/30; B01D 2257/102; B01D 2257/502; B01D 2257/504; B01D 2257/7025; B01D 2259/4145; B01J 20/12; B01J 20/165; B01J 20/20; B01J 20/2803; B01J 20/28054; B01J 20/3234; B01J 20/3238; B01J 20/3293

USPC ...... 95/96, 129, 139, 143, 900, 902; 96/132, 96/154; 502/400
See application file for complete search history.

(56) References Cited

U.S. PATENT DOCUMENTS

| 4,526,877 | A | 7/1985 | Acharya et al. |
| 5,769,928 | A | 6/1998 | Leavitt |
| 5,779,767 | A | 7/1998 | Golden et al. |
| 6,027,548 | A | 2/2000 | Ackley et al. |
| 6,284,021 | B1 | 9/2001 | Lu et al. |
| 6,302,943 | B1 | 10/2001 | Johnson et al. |
| 6,358,302 | B1 | 3/2002 | Deng et al. |
| 6,605,136 | B1 | 8/2003 | Graham et al. |
| 6,638,340 | B1 | 10/2003 | Kanazirev et al. |
| 6,689,714 | B2 * | 2/2004 | Wheelock ............ B01D 53/48 502/400 |
| 6,790,260 | B2 | 9/2004 | Ackley et al. |
| 7,294,172 | B2 * | 11/2007 | Baksh ................ B01D 53/04 95/117 |
| 7,892,328 | B2 * | 2/2011 | Nakao ................ B01D 53/047 96/132 |
| 8,657,924 | B2 | 2/2014 | Zheng et al. |

(Continued)

FOREIGN PATENT DOCUMENTS

| CN | 103857466 A | 6/2014 |
| EP | 1 080 771 A1 | 3/2001 |

(Continued)

OTHER PUBLICATIONS

Machine-generated English translation of FR 2794993 A1, published Dec. 2000.*

(Continued)

*Primary Examiner* — Frank M Lawrence, Jr.
(74) *Attorney, Agent, or Firm* — Ralph J. Mancini (57) ABSTRACT

The invention relates to the intensification of hydrogen PSA processes through utilization of specifically engineered core-shell composite adsorbents. Different embodiments of core-shell adsorbents can be used with either high or low heat capacity cores, and different adsorbent shells (e.g. activated carbon, zeolite, silica gel, alumina etc.) resulting in higher mass transfer rates and hence sharper mass transfer fronts during the PSA process. The location of the limiting impurity front determines the product purity. Therefore, with sharper impurity fronts, lower height of adsorbent bed is required, and cycle time can be proportionally reduced. Also, thermal swing during the PSA can be reduced by use of such adsorbents. The use of a high heat capacity core to reduce the thermal swing, leads to higher overall working capacity of the adsorbent bed.

23 Claims, 5 Drawing Sheets

(56) References Cited

U.S. PATENT DOCUMENTS

| | | |
|---|---|---|
| 8,814,985 B2 | 8/2014 | Gerds et al. |
| 9,737,846 B2 | 8/2017 | Carstensen et al. |
| 2002/0103074 A1 | 8/2002 | Wheelock et al. |
| 2011/0247495 A1* | 10/2011 | Marco ................ B01J 20/28019 |
| | | 95/127 |
| 2012/0152115 A1 | 6/2012 | Gerds et al. |
| 2012/0174775 A1* | 7/2012 | Baksh ...................... C01B 3/56 |
| | | 95/96 |
| 2013/0139760 A1* | 6/2013 | Fritter .................. A01K 1/0155 |
| | | 119/173 |
| 2018/0001302 A1 | 1/2018 | Lee et al. |
| 2018/0008958 A1 | 1/2018 | Choi et al. |
| 2018/0178158 A1 | 6/2018 | Zheng et al. |
| 2018/0264437 A1* | 9/2018 | Le Bot ..................... B01J 20/26 |

FOREIGN PATENT DOCUMENTS

| | | |
|---|---|---|
| EP | 2 198 946 A1 | 6/2010 |
| FR | 2794993 A1 | 12/2000 |
| KR | 1020140064836 A | 5/2014 |
| WO | 2013/022521 A1 | 2/2013 |

OTHER PUBLICATIONS

Alfons Brandt et al., "Novel zeolite composites and consequences for rapid sorption processes", Adsorption (2007) 13: 267-279, DOI 10, 1007/s10450-007-9019-3, Springer.

* cited by examiner

CORE-SHELL COMPOSITE ADSORBENT FOR USE IN HYDROGEN AND HELIUM PSA PROCESSES

FIELD OF THE INVENTION

The present invention provides composite adsorbents useful in adsorption processes for separating components of a gas stream. More particularly, the present invention is directed to core-shell composite adsorbents useful for the removal of contaminants, such as at least carbon dioxide ($CO_2$), carbon monoxide (CO), methane ($CH_4$) from feed gas streams in a cyclic pressure swing adsorption (PSA) process prior to further processing, especially in production of hydrogen. Preferably, the core-shell composite adsorbent is used to intensify the adsorption system by reducing the amount of adsorbent required, and/or reduce process cycle time, therefore reducing the overall system size.

BACKGROUND OF THE INVENTION

Pressure swing adsorption (PSA) is a well-known method to separate hydrogen from a mixture of other gases including $CO_2$, CO, $CH_4$, $N_2$ etc. In brief, it consists of two or more adsorption beds containing various layers of adsorbents which perform different purification functions. For example, the bottom layer maybe alumina to remove any water vapor, above that could be a layer of activated carbon to perform adsorption of $CO_2$ and $CH_4$ primarily and above the carbon layer are generally one or more zeolite layers to adsorb CO and $N_2$ and perform trace removal of the remaining gases. Hydrogen has very little interaction with these adsorbents, allowing for >99.9% purity hydrogen to be obtained at the top of the beds as the product. By cycling the pressure between high (adsorption) and low (desorption), the beds are cycled between producing product and removing impurities. Some examples using conventional homogeneous beaded adsorbents are described in U.S. Pat. Nos. 6,302,943 and 6,605,136.

As the recent focus of hydrogen PSA process has been towards process intensification, achieved through reduction of system size and faster cycles, the productivity of conventional adsorbents must be increased. One way to achieve this is to increase the mass transfer rate in the adsorbent beads, leading to faster adsorption/desorption rates of the impurity gases. This leads to sharpening of mass transfer fronts within the beds, enabling lower amounts of adsorbent i.e. shorter beds to be used.

In U.S. Pat. No. 6,790,260, the mass transfer rate of the adsorbent is increased by reducing the particle size. This reduces the path length that adsorbates must travel within the particle through the rate-limiting macropores of the agglomerated adsorbent. However, the limitations of this method, including higher pressure drop and increased risk of fluidization in unconstrained adsorption beds are unresolved.

U.S. Pat. No. 6,284,021 to Lu et al. describes a method to increase mass transfer rate by formulating a core-shell composite adsorbent, comprising a non-porous and non-adsorbent inner core and shell consisting of at least one adsorbent material forming a shell. Through simulation of VSA production of oxygen from air, it was shown that lower active adsorbent content of composite was offset by the improved mass transfer rate, resulting in 14% performance advantage for the composite. However, no specific examples disclosing particle size distribution, core characteristics or bead forming process were provided.

U.S. Pat. No. 8,814,985 to Gerds et al. discloses another type of core-shell composite adsorbent, the difference being that the core has a porosity between 10 and 50%. Such composite adsorbent beads are reported to exhibit higher crush strength than adsorbent beads containing a non-porous core and a porous shell. Pilot results for hydrogen PSA process, TSA process to remove nitrogen impurity from helium, and PVSA process for producing oxygen from air indicate improved performance over that of conventional homogenous adsorbent beads.

U.S. Pat. No. 6,284,021 to Brandt et al. describes an adsorption process using a core-shell composite with the core that is approximately 50% or more by volume of the final composite. However, they also report that all such adsorbents have lower volumetric performance and would require more steps to produce in addition to lowering the overall production of an equivalent size commercial system.

In the present invention, we extend the application of the specifically designed core-shell adsorbents to intensify PSA processes for hydrogen and other gas separation and purification. Such applications of core-shell adsorbents which lead to lower cycle time or reduced bed size factor (which is defined as amount of adsorbent required to process unit feed gas or produce unit product gas) i.e. higher adsorbent productivity have not been successfully described previously. In addition, higher heat capacity and dense cores can be used in our composite adsorbents, leading to suppression of the thermal swing during the PSA cycle, leading to increased working capacity of the adsorbent bed. Couples with adsorbent layering strategies, employing core-shell adsorbents with carbon or zeolite shell and non-porous cores for both bulk as well as trace adsorption of impurity gases for feed gas mixtures from different sources can provide surprising and significant improvements in PSA processes. In all cases, the core-shell adsorbents lead to reduced cycle time/increased adsorbent productivity over conventional beaded or granular adsorbents.

SUMMARY OF THE INVENTION

The invention is related to superior core-shell composite adsorbents for intensification of hydrogen PSA processes. By using a non-porous core, such composite adsorbents reduce the path length for diffusion of gas molecules. This results in higher mass transfer rates and hence sharper mass transfer fronts during the PSA process. The location of the limiting impurity front determines the product purity. Therefore, with sharper impurity fronts, lower height of adsorbent bed is required, and cycle time can be proportionally reduced. Also, thermal swing during the PSA can be reduced by use of such adsorbents. This swing is caused due to release of the heat of adsorption of impurity gases on the adsorbents leading to high temperature during the adsorption or feed step and a drop in temperature during the purge or impurity clean-up step. The use of a high heat capacity core to reduce the thermal swing, leads to higher overall working capacity of the adsorbent bed. Different formulations of core-shell adsorbents can be used with either high or low heat capacity cores, and different adsorbent shells (e.g. activated carbon, zeolite, silica gel, alumina etc.).

DETAILED DESCRIPTION OF THE INVENTION

The invention generally relates to a cyclic polybed adsorption process for separating a mixture of feed gases, wherein the adsorption process comprises at least one adsorbent vessel comprising multiple adsorbent layers wherein at least one layer comprises activated carbon and at least one layer comprises a tunable core-shell composite adsorbent with tunable mass transfer rate, heat capacity and adsorption capacity, wherein said tunable adsorbent comprises an adsorbent shell comprising zeolite or carbon and a binder, and an inert core, wherein the core fraction of said adsorbent from about 5 to about 90 wt % of the adsorbent, wherein the porosity of core is less than about 10%, and the α value of the tunable adsorbent is $2 \leq \alpha \leq 8$.

Use of a layered bed for hydrogen PSA process is well-known in the art. Typically, the bottom layer consists of alumina for water removal, the second layer is generally activated carbon for bulk removal of $CO_2$ and $CH_4$, while the top layers consist of one or more zeolites to remove CO, $N_2$ and perform trace removal of the other impurity gases. According to the present invention, a specifically engineered core-shell adsorbent replaces all or part of the activated carbon layer or zeolite layer and performs bulk and/or trace removal of impurity gases. Bulk gases are defined as >1% by volume and trace gases are defined as <1% by volume of impurity gases. Through process modeling, we show that use of core-shell adsorbents, which have a higher mass transfer rate than conventional beaded or granular adsorbents, allow for smaller beds and thus reduction in cycle time and capital cost of hydrogen PSA systems.

The use of core-shell adsorbents is described in hydrogen PSA process with two different feed types (SMR and CO coldbox). In SMR feeds, a major contaminant is $CO_2$ which is conventionally adsorbed by activated carbon. In accordance with the present invention it is demonstrated that a core-shell with high heat capacity core can lead to process intensification and reduce thermal swing. The invention also contemplates the use of a combination of conventional activated carbon and core-shell 13X-type zeolite for trace removal of $CO_2$ when processing SMR feeds, again leading to adsorbent bed height reduction/cycle time reduction. The activated carbon can further be replaced by a core-shell carbon, resulting in further height reduction/cycle time reduction. For CO coldbox feeds, the primary contaminant is CO with little to no $CO_2$. In this case a core-shell 13X-type zeolite is used to entirely replace the conventionally-used activated carbon layer. Higher mass transfer rate leads to reduction in bed height/cycle time.

For bulk separation, a desirable core comprises a non-adsorbing, high heat capacity material. Suitable examples of inert core materials include dense ceramics, sand, bauxite, cordierite, analcite, hematite, magnetite, granite, marble, dolomitic limestone, shale, and combinations thereof. The volumetric thermal capacity of the core of said tunable core-shell adsorbent is generally greater than 1 J/cc-K. The mass transfer rate, heat capacity and adsorption capacity of said tunable adsorbent is tuned by varying the core/shell diameter ratio with fixed overall particle size.

The shell surrounding the core material has high bulk contaminant separation adsorption capacity. In general, for the same size particle, inserting a high heat capacity, non-adsorbing core to make the composite core-shell material has three major effects from an adsorption process perspective: first, it reduces the overall adsorption capacity as well as working capacity due to the space the core occupies; second, the rate is improved because of the shorter diffusion length, and third, the temperature gradient during adsorption (resulting from the heat of adsorption) can be dampened and in turn improve capacity.

A core-shell zeolite (5A or 13X) that has higher capacity for certain contaminants can offset the capacity loss due to the non-adsorbing core. The improved rate will enhance the regenerability of the core-shell zeolite, and the temperature dampening can improve its adsorption capacity. The same core material used for core-shell carbon and core-shell zeolite are proposed for the new core-shell 5A or 13X for $H_2$ PSA bulk separation.

The adsorbent shell of said core-shell adsorbent generally comprises one or more adsorbents having crystalline inorganic frameworks such as zeolites, aluminas, silicas, carbons, activated carbons, molecular organic frameworks (MOFs), transition metal substituted silicas, zincosilicates, titanosilicates and mixtures thereof.

Crystalline inorganic adsorbents are defined as any microporous aluminosilicate having a regular arrangement of atoms in a space lattice. Zeolites are a preferred crystalline inorganic framework. Zeolites are porous crystalline aluminosilicates which comprise assemblies of $SiO_4$ and $AlO_4$ tetrahedra joined together through sharing of oxygen atoms. The general stoichiometric unit cell formula for a zeolite framework is:

$$M_{x/m}(AlO_2)x(SiO_2)y]zH_2O$$

where M is the cation with a valence of m, z is the number of water molecules in each unit cell, and x and y are integers such that y/x is greater than or equal to 1. The ratio of oxygen atoms to combined aluminum and silicon atoms is equal to 2. Therefore, each aluminum atom introduces a negative charge of one (−1) on the zeolite framework which is balanced by that of a cation. To activate the zeolite the water molecules are completely or substantially removed by raising the temperature or pulling vacuum. This results in a framework with the remaining atoms intact producing cavities connected by channels or pores. The channel size is determined by the number of atoms which form the apertures leading to the cavities as well as cation type and position. Changing the position and type of the cation allows one to change and fine tune channel size and the properties of the zeolite, including its selectivity. For instance, the sodium form of Zeolite A has a pore size of ~4/Å and is called a 4 A molecular sieve. If at least 40% of the sodium ions are exchanged with a larger potassium ion, the pore size is reduced to ~3 Å. If these are exchanged with >70% calcium, one calcium ion replaces two sodium ions and the pore opening is increased to ~5 Å. The ability to adjust pores to precisely determine uniform openings allows for molecules smaller than its pore diameter to be adsorbed while excluding larger molecules. The Si/Al ratio can also be varied to modify the framework structure and provide selectivity required for a given separation. This is why zeolites, known as molecular sieves, are very effective in separating on the basis of size.

Some non-limiting examples of zeolites that can be employed in the context of the invention include zeolite A, X, Y, LSX, chabazite, mordenite, faujasite, clinoptilolite, ZSM-5, L, Beta, or combinations thereof. The above zeolites can be exchanged with cations including Li, Na, K, Mg, Ca, Sr, Ba, Cu, Ag, Zn, NH4+ and mixtures thereof. In another embodiment the zeolite is type X with a $SiO_2/Al_2O_3$ ratio of less than or equal to 2.5. In another embodiment the zeolite is type X with a $SiO_2/Al_2O_3$ ratio of about 2.0.

The core-shell adsorbent of the invention also typically includes a binder during the fabrication process, generally from about 1 to about 25 wt %; in another embodiment from about 10-20 wt %. For zeolite type core-shell adsorbents the binder content is generally in a range of from about 2-20 wt %, in another embodiment from about 2-12 wt %. With carbon core-shell adsorbents the binder content is generally in a range of from about 2-12 wt %, in another embodiment from about 3 to about 7 wt %. In one embodiment the binder of said core-shell adsorbent is a clay selected from the group consisting essentially of attapulgite, sepiolite, kaolin, halloysite, polysaccharides, organic polymers and mixtures thereof.

The core fraction of said core-shell adsorbent is generally less than about 40 wt % for bulk contaminant removal, in another embodiment less than or equal to about 35 wt %.

For trace contaminant removal, the core only needs to be non-adsorbing material to reduce diffusion length to enable higher mass transfer rate of limiting trace contaminants. Core-shell adsorbent layered with conventional adsorbents described to further increase design flexibility and reduce system cost. Heat capacity is not as essential as the adsorbent for bulk separation since the thermal swing from the adsorption and desorption from trace removal zone is significantly lower than the bulk separation zone. Instead, the mass transfer rate of the adsorbent is more critical to ensure product purity is met. The core fraction of said core-shell adsorbent is generally greater than or equal to 40 wt % for trace contaminant removal, in another embodiment greater than or equal to 50 wt %.

The carbon core-shell adsorbent according to the invention generally comprises an adsorbent shell comprising carbon, wherein said carbon is activated carbon derived from coal, charcoal, wood, coconut shell, polymer, pitch and mixtures thereof.

Apart from $H_2$ PSA processes, core-shell adsorbents can have wide application in other adsorption-based separation technologies. Previous publications have demonstrated the benefits of core-shell adsorbents for removal $H_2O$ and $CO_2$ from air, syngas purification, $O_2$ VPSA etc.

The present invention also extends core-shell adsorbent technology to Helium PSA processes.

Helium PSA processes consist of adsorption beds to separate purify Helium from 1-10% to >99% from a feed mixture primarily consisting of $N_2$ (45-90%) with smaller amounts of $CH_4$, $CO_2$, $H_2O$, heavy hydrocarbons etc. Such feed streams are obtained from helium-rich natural gas wells. The adsorbent layering consists of alumina, carbon and zeolite. Silica gel may be used in cases where heavy hydrocarbons are present.

According to the invention part or all of the carbon layer is replaced by core-shell carbon and part or all of the zeolite is replaced by core-shell zeolite. The advantages of core-shell carbon over conventional activated carbon for hydrogen PSA, such as increased mass transfer rate and reduced thermal swing in the bed have been described in detail herein. Such benefits are also seen for the helium PSA process. The advantages of core-shell zeolite in $O_2$ VPSA, for example, 6% productivity increase and 4% power reduction have been demonstrated. By extension, core-shell zeolite would be more effective at $N_2$ removal in He PSA process compared to conventional zeolites.

The invention is applicable to any adsorption process including but not limited to pressure swing, temperature swing or vacuum pressure swing adsorption process. The feed gas mixture also can vary with the proviso that the core-shell adsorbent is engineered to maximize productivity depending on the composition of the feed gas.

In one embodiment the invention relates to a cyclic gas adsorption process for separation of a mixture of feed gases, wherein the adsorption system consists of multiple layers wherein at least one layer comprises activated carbon and at least one layer comprises a tunable core-shell composite adsorbent with tunable mass transfer rate, heat capacity and adsorption capacity, wherein said tunable adsorbent comprises an adsorbent shell comprising zeolite or carbon and a binder, and an inert core, wherein the core fraction of said adsorbent from about 5 to about 90 wt % of the adsorbent, wherein the porosity of core is less than about 10%, and the $\alpha$ value of the tunable adsorbent is $2 \leq \alpha \leq 8$, where "$\alpha$" is defined below in equation (1).

In another embodiment the feed gas mixture is from a CO coldbox and contains $H_2$, CO, $CH_4$ and $N_2$ and substantially no $CO_2$, and wherein the carbon core-shell adsorbent entirely replaces the activated carbon layer. In another embodiment the feed gas mixture contains greater than about 70% $H_2$, less than about 20% CO, balance being $CH_4$ and $N_2$.

In another embodiment the feed gas mixture comes from a steam methane reformer and contains $H_2$, $CO_2$, CO, $CH_4$ and $N_2$, and wherein all or part of the activated carbon layer is replaced by the core-shell adsorbent wherein the shell of said adsorbent comprises zeolite. In another embodiment the feed mixture contains greater than about 50% $H_2$, greater than about 5% $CO_2$, balance being CO, $CH_4$ and $N_2$.

In another embodiment the feed gas mixture contains $H_2$, CO, $CO_2$, $CH_4$, N2 and hydrocarbons and is derived from refinery and/or chemical off-gases selected from ethylene cracker off-gas, propane dehydrogenation off-gas, or methanol off-gas.

In another embodiment the feed gas mixture contains He, $N_2$, $CH_4$, $CO_2$, $H_2O$, and is derived from a helium-rich natural gas well.

In yet another embodiment the feed gas mixture is air containing $O_2$, $N_2$, trace $CO_2$, trace $H_2O$ and in another embodiment the feed gas mixture is syngas containing $H_2$, CO, $CO_2$ and $H_2O$.

Figure 1:
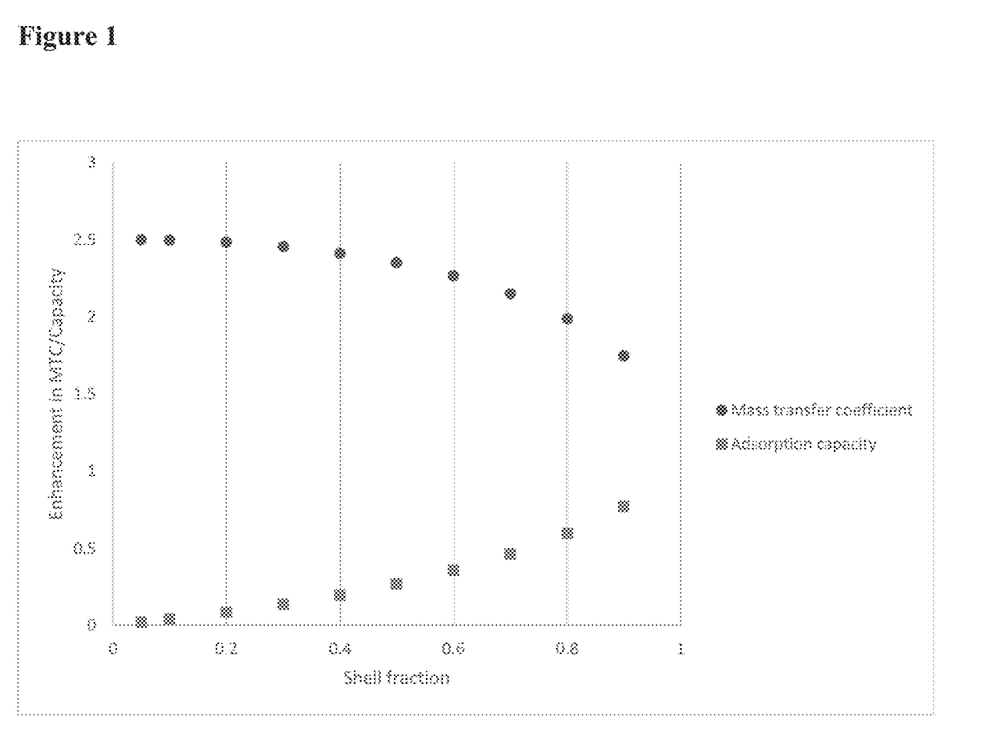
FIG. 1—shows the variation of mass transfer coefficient and saturation adsorption capacity with shell fraction. "1" on the y-axis represents MTC or saturation adsorption capacity of a corresponding conventional (non-core-shell) adsorbent material.

Method for Design of Core-Shell Adsorbents:

The mass transfer coefficient (MTC) of an adsorbent particle is inversely proportional to the square of the diffusion length. The larger the core, the smaller the diffusion length and hence higher is the MTC. Saturation adsorption capacity ($X_0$) of an adsorbent particle is directly proportional to volume fraction of shell. Larger the core, smaller is $X_0$. Thus, there is an inherent trade-off between MTC and $X_0$, as seen in FIG. 1. Apart from MTC and $X_0$, the pressure drop ($\Delta P$) is another important parameter that determines process performance. Therefore, simply reducing particle size to achieve MTC enhancement may cause a loss in process performance due to higher pressure drop.

The present inventors have found that the parameter "$\alpha$" given by equation (1) can be used as a design parameter for engineering core-shell materials to maximize performance in a given application.

$$\alpha = \frac{\left(\frac{MTC}{X_0 \times \Delta P}\right)_{core\text{-}shell}}{\left(\frac{MTC}{X_0 \times \Delta P}\right)_{non\ core\text{-}shell}} \quad (1)$$

The range of values for "$\alpha$" in which there is an improvement in performance varies depending on the application of the material. For bulk separation, the acceptable range for "$\alpha$" ranges from about 2 to about 5, while for trace separation, the acceptable range for "$\alpha$" ranges from about 5 to about 8. An "$\alpha$" value of less than 2 or greater than 8 will cause a loss in process performance because enhancement in MTC is not enough to overcome the loss in adsorption capacity.

TABLE 1

System size or cycle time reduction through the use of core-shell adsorbents for various applications in hydrogen and helium PSA processes in 12-bed H2 PSA systems

| Adsorbent layering | Feed gas | Function | System size reduction |
|---|---|---|---|
| Core-shell carbon, 5A, CaX | SMR* | Bulk and trace removal of $CO_2$, $CH_4$ | 19% |
| Activated carbon, core-shell 13X, 5A, CaX | SMR* | Trace removal of $CO_2$, $CH_4$ | 20% |
| Core-shell carbon, Core-shell 13X, 5A, CaX | SMR* | Bulk and trace removal of $CO_2$, $CH_4$ | 36% |
| Core-shell 13X, 5A, CaX | CO coldbox | Bulk removal of CO | 18-20% |
| Silica gel, activated carbon, core-shell carbon, LiX/CaX, core-shell LiX/CaX | He PSA feed (He, $N_2$, $CO_2$, $CH_4$, heavies) | Bulk and trace removal of $N_2$, $CO_2$, $CH_4$, heavies | 19-36% |

*For our process models, the first adsorbent layer is alumina in case of SMR feeds.

The invention will now be illustrated by the following non-limiting examples.

Example 1: Core-Shell Carbon for Bulk $CO_2$ Removal and Temp Dampening

Process modeling of cyclic adsorption process is done by assuming a 1-dimensional adsorption bed with different adsorbent layers stacked on top of each other. The adsorbent layers are divided into various nodes, and energy and mass balance calculations are performed at each node at every time point. We assume Ergun equation for momentum balance calculation and lumped fluid resistance model for kinetics. LRC model is used for adsorption isotherm and heat of adsorption calculations. We also assume an adiabatic and non-isothermal system. The adsorption bed is subjected to a specific feed composition and the cycle time is varied to obtain the required product purity. In the following examples, performance of the PSA system with core-shell adsorbent versus conventional adsorbents is compared at the same $H_2$ recovery. In all cases, use of core-shell adsorbent allows for system size and cycle time reduction.

Figure 2:
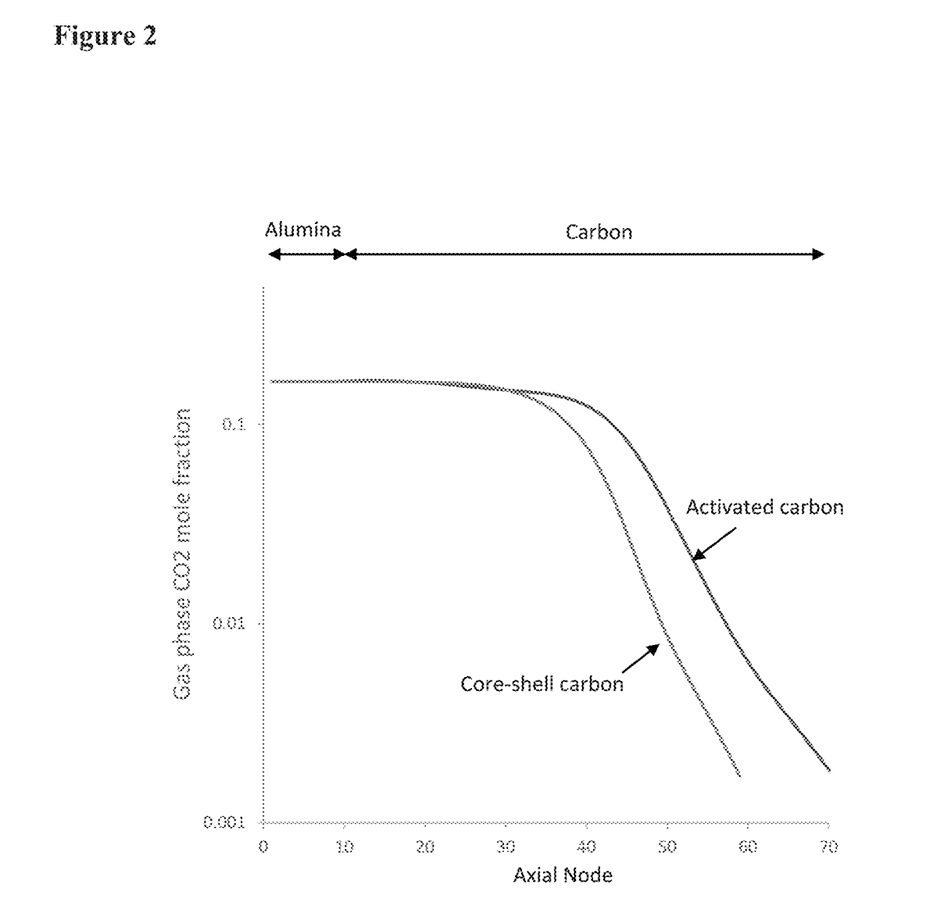
FIG. 2 shows axial $CO_2$ fronts of adsorption bed at the end of adsorption step from process modeling when using conventional activated carbon and core-shell carbon in hydrogen PSA process for SMR feed mixture. 1 node on the x-axis ~0.15 ft in bed height.
Figure 3:
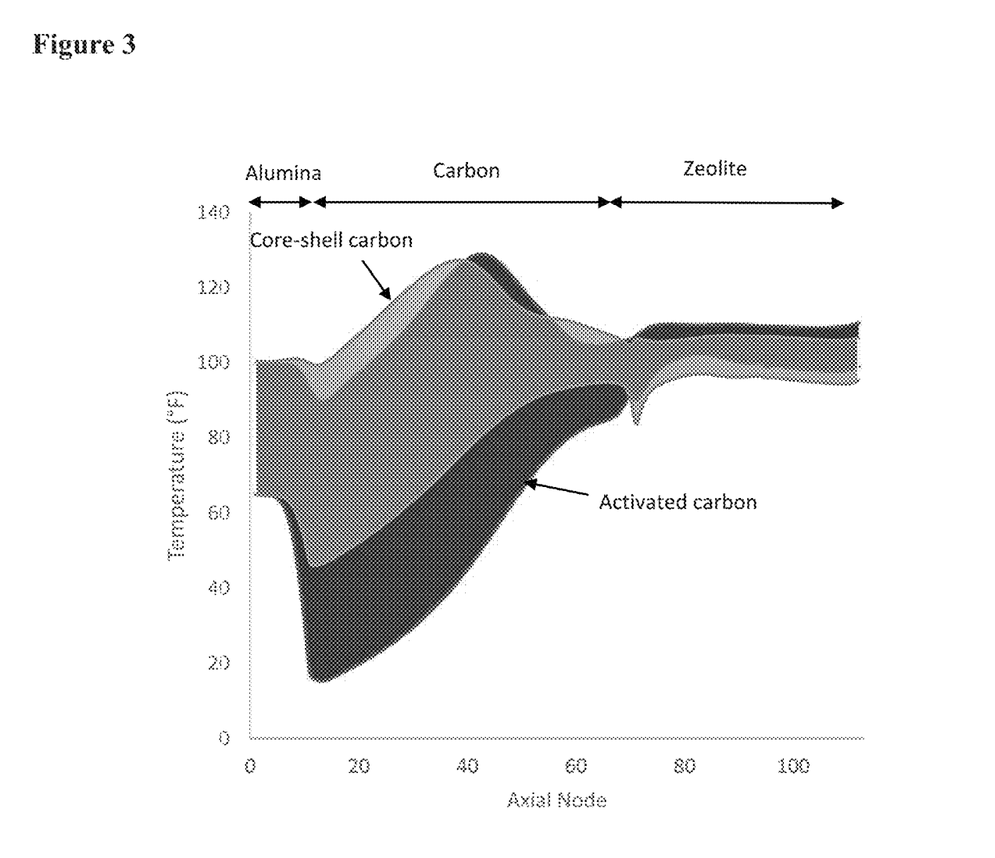
FIG. 3 shows Axial temperature fronts of adsorption bed at the end of adsorption step from process modeling when using conventional activated carbon and core-shell carbon in hydrogen PSA process for SMR feed mixture. 1 node on the x-axis ~0.15 ft in bed height.

$H_2$ PSA process model shows significant improvements through use of core-shell carbon in place of conventional activated carbon. As seen in FIG. 2, the $CO_2$ front is sharper i.e. pushed lower down the bed, in the case of core-shell carbon compared to activated carbon. This is primarily due to the mass transfer coefficient of core-shell carbon being almost double that of activated carbon (35 wt % core fraction). Since the $CO_2$ front is pushed further back, this allows for a 19% reduction in overall bed height required. Additionally, for a 12-bed system with SMR feed, process modeling predicts 30% lower height of core-shell carbon needed compared to activated carbon, resulting in 3% capital cost reduction. Core-shell carbon can also enable use of 10 bed system at equivalent performance to a 12 bed system with activated carbon, resulting in 4% reduction in capital cost. Core-shell carbon comprises a core made of dense non-porous bauxite and a shell made of coconut carbon. The presence of the core (for example, bauxite) increases the heat capacity of the material and will potentially prevent adverse thermal swing during the process (FIG. 3).

Example 2: Core-Shell Zeolite for Bulk CO Removal

Figure 4:
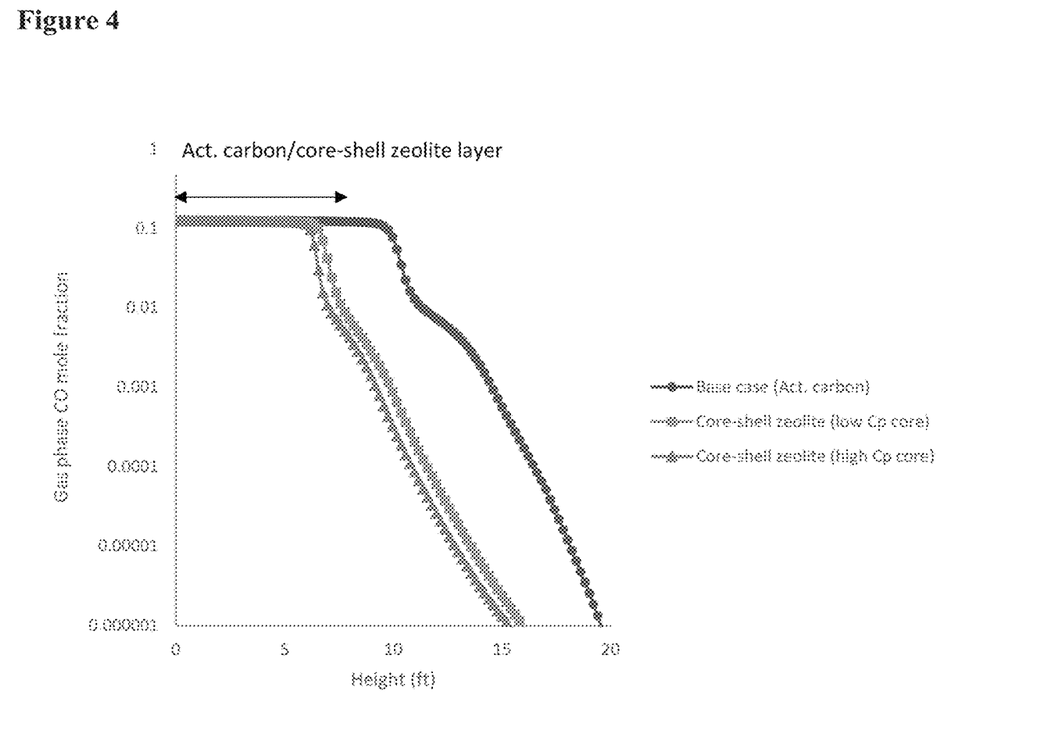
FIG. 4 shows axial CO fronts of adsorption bed at the end of adsorption step from process modeling when using conventional activated carbon and core-shell zeolite in hydrogen PSA process with CO coldbox feed mixture.
Figure 5:
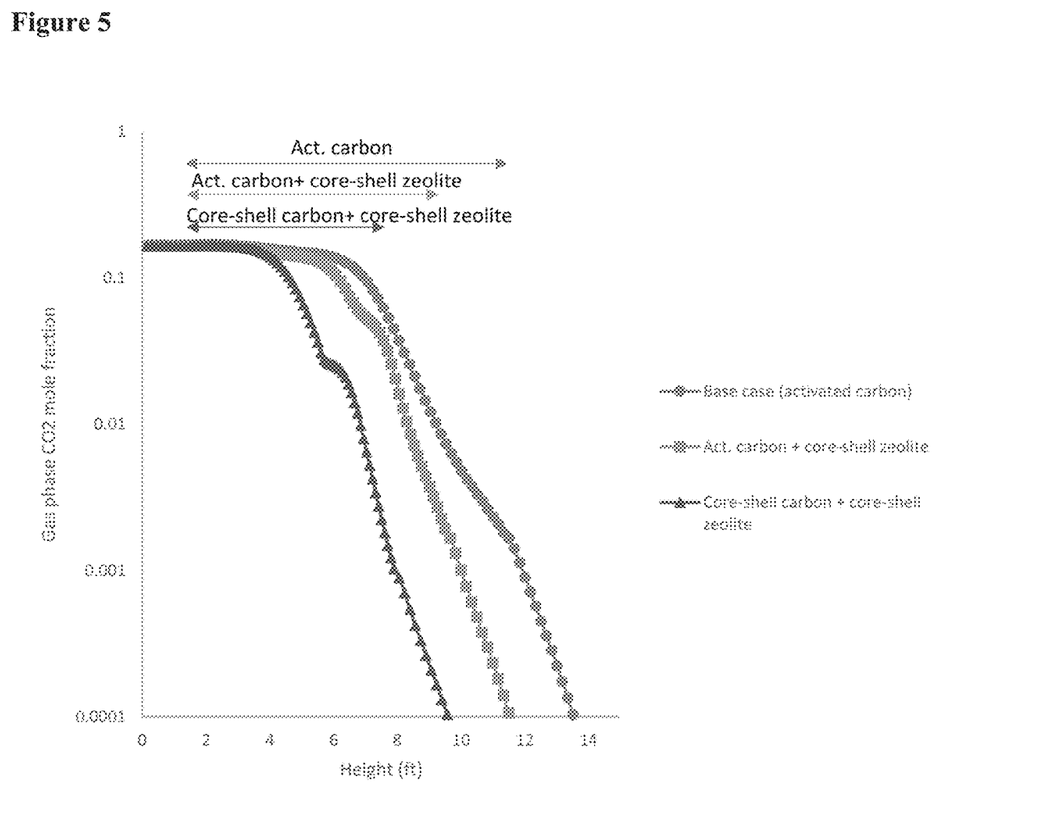
FIG. 5 shows axial $CO_2$ fronts of adsorption bed at the end of adsorption step from process modeling when using conventional activated carbon, combination of activated carbon and core-shell zeolite, and combination of core-shell carbon and core-shell zeolite in hydrogen PSA process with SMR feed mixture.

In case of CO coldbox feed ($H_2$, CO, $CH_4$ primarily and substantially no $CO_2$), activated carbon is generally used for bulk $CH_4$ removal with little to no CO removal. Use of a zeolite will provide higher working capacity for CO removal. Core-shell zeolite allows for higher rate of adsorption/desorption, resulting in reduction in overall height of the layer. Through modeling it is observed that use of core-shell 13X (35 wt % core fraction) instead of activated carbon allows between 25-30% reduction in height of the bulk CO removal layer while maintaining the same H2 recovery and product purity (see FIG. 4). Core-shell 13X contributes to significant removal of CO before it reaches the upper layers of bed, while conventional activated carbon performs little to no CO adsorption. Use of high heat capacity core leads to further reduction in bed height/cycle time—up to 20% reduction over the conventional process.

Example 3: Core-Shell Zeolite for Trace $CO_2$ Removal

For SMR feed ($H_2$, $CO_2$, CO, $CH_4$ primarily), activated carbon is generally used for $CO_2$ removal—from percent-level to 100 ppm. However, the carbon layer can be reduced by 50%, in order to only perform bulk $CO_2$ removal. The trace removal is then done using only a capping layer of core-shell 13X (50 wt % core fraction), resulting in 20% overall BSF reduction while maintaining the same $H_2$ recovery and product purity. Higher working capacity and mass transfer rate in core-shell zeolite allows for trace removal of $CO_2$ with a reduced layer height. Since the core-shell adsorbent is used for trace removal only, the thermal swing in this layer is lower and hence lower heat capacity core can be used, and in fact preferred

Example 4: Core-Shell Carbon+Core-Shell Zeolite for Bulk and Trace CO$_2$ Removal As seen in Example 3, the overall height of the CO$_2$ removal layer can be reduced by 20% if a capping layer of core-shell zeolite is used for trace CO$_2$ removal. Through modeling it is observed that if activated carbon is further replaced by core-shell carbon (35 wt % core fraction), the bed height and cycle time can be reduced by 36% compared to the conventional process while maintaining the same recovery and product purity.

We claim:

1. A cyclic adsorption process for separating a mixture of feed gases, wherein the adsorption process comprises feeding said mixture to an adsorbent vessel comprising a layered adsorbent bed having a trace separation zone and a bulk separation zone, wherein said adsorbent bed in each of said trace and bulk separation zones comprises one or more non-core shell adsorbents and at least one tunable core-shell composite adsorbent layered in said zones, said core-shell adsorbent having a tunable mass transfer rate, heat capacity and adsorption capacity, said composite core-shell adsorbent having an inert core and an adsorbent shell comprising binder, wherein the tunable core-shell adsorbent in the bulk separation zone has an α value that ranges from about $2 \leq \alpha \leq 5$ and a core fraction of <40 wt % and the core-shell adsorbent in the trace separation zone has an α value of from $5 \leq \alpha \leq 8$ and a core fraction of greater than or equal to 40 wt %.

2. The process of claim 1 wherein said one or more non-core shell adsorbents and the tunable core-shell adsorbents are layered in the bulk separation zone of the adsorption bed and wherein the volumetric thermal capacity of the core of the tunable core-shell adsorbent is greater than 1 J/cc·K.

3. The process of claim 1 wherein mass transfer rate, heat capacity and adsorption capacity of said tunable adsorbent is tuned by varying the core/shell diameter ratio with fixed overall particle size.

4. The process of claim 1 wherein the binder of said core-shell adsorbent is a clay selected from the group consisting of attapulgite, sepiolite, kaolin, halloysite, polysaccharides, organic polymers and mixtures thereof.

5. The process of claim 1 wherein said adsorbent shell of said tunable core-shell adsorbent comprises one or more of zeolites, aluminas, silicas, carbons, activated carbons, molecular organic frameworks (MOFs), transition metal substituted silicas, zincosilicates, titanosilicates.

6. The process of claim 5 wherein said zeolite is selected from X, LSX, Y, A, L, ZSM-5, Mordenite, Clinoptilolite, Chabazite and mixtures thereof.

7. The process of claim 6 wherein said zeolite has a SiO2/Al2O3 ratio of from about 1.9 to 10, and wherein the zeolite is exchanged with at least one cation selected from H, Li, Na, K, Mg, Ca, Sr, Ba, Ag, Cu and mixtures thereof.

8. The process of claim 6 wherein the zeolite is type X with a SiO$_2$/Al$_2$O$_3$ ratio of less than or equal to 2.5.

9. The process of claim 6 wherein the zeolite is type X with a SiO$_2$/Al$_2$O$_3$ ratio of about 2.0.

10. The process of claim 4, wherein the binder content of said tunable core-shell adsorbent is ranges from about 2 to about 12 wt %.

11. The process of claim 1 wherein said tunable adsorbent comprises a carbon core-shell adsorbent comprising an adsorbent shell comprising carbon, wherein said carbon is activated carbon derived from coal, charcoal, wood, coconut shell, polymer, pitch or mixtures thereof.

12. The process of claim 11, wherein binder content of said tunable core-shell adsorbent ranges from about 1 to about 25 wt %.

13. The process of claim 1 wherein the inert core of said tunable core-shell adsorbent is selected from dense ceramics, sand, bauxite, cordierite, analcite, hematite, magnetite, granite, marble, dolomitic limestone, shale, and combinations thereof.

14. The process of claim 1 wherein the adsorption process is selected from pressure swing, temperature swing or vacuum pressure swing adsorption process.

15. The process of claim 1 where the feed gas mixture contains H$_2$, CO, CO$_2$, CH$_4$, N$_2$ Ar, C$_2$, C$_3$ and/or C$_4$+ hydrocarbons and is derived from refinery and/or chemical off-gases selected from ethylene cracker off-gas, propane dehydrogenation off-gas, or methanol off-gas.

16. The process of claim 1 where the feed gas mixture contains He, N$_2$, CH$_4$, CO$_2$, H$_2$O, C$_2$, C$_3$ and/or C$_4$+ hydrocarbons and is derived from a helium-rich natural gas well.

17. The process of claim 1 where the feed gas mixture is air containing O$_2$, N$_2$, trace CO$_2$, H$_2$O and Ar.

18. The process of claim 1 where the feed gas mixture is syngas containing H$_2$, CO, CO$_2$ and H$_2$O.

19. The process of claim 1 wherein said layered adsorbent bed additionally comprises at least one layer containing activated carbon adsorbent, a tunable carbon core-shell composite adsorbent having an inert core and an adsorbent shell comprising binder and activated carbon adsorbent, or a mixture thereof.

20. The process of claim 19 wherein the feed gas mixture is from a CO coldbox and contains H$_2$, CO, CH$_4$, N$_2$, Ar, and substantially no CO$_2$, and wherein said additional layer comprises tunable carbon core-shell adsorbent.

21. The process of claim 20 wherein the feed gas mixture contains greater than about 50% H$_2$, less than about 20% CO, balance being CH$_4$, Ar and N$_2$.

22. The process of claim 19 where the feed gas mixture comes from a steam methane reformer and contains H$_2$, CO$_2$, CO, CH$_4$, N$_2$, Ar.

23. The process of claim 22 wherein the feed mixture contains greater than about 50% H$_2$, greater than about 5% CO$_2$, balance being CO, CH$_4$, N$_2$, and Ar.

* * * * *